United States Patent [19]

Laskow et al.

[11] 4,294,788

[45] Oct. 13, 1981

[54] METHOD OF MAKING A SHAPED SILICON CARBIDE-SILICON MATRIX COMPOSITE AND ARTICLES MADE THEREBY

[75] Inventors: William Laskow, Downingtown, Pa.; Charles R. Morelock, Ballston Spa, N.Y.

[73] Assignee: General Electric Company, Schenectady, N.Y.

[21] Appl. No.: 131,941

[22] Filed: Mar. 21, 1980

Related U.S. Application Data

[60] Division of Ser. No. 100,579, Dec. 5, 1979, Pat. No. 4,240,835, which is a continuation-in-part of Ser. No. 946,718, Sep. 28, 1978, abandoned, which is a division of Ser. No. 572,969, Apr. 30, 1975, Pat. No. 4,141,948, which is a continuation-in-part of Ser. No. 354,106, Apr. 24, 1973, abandoned.

[51] Int. Cl.$^3$ ............................................. C04B 34/70
[52] U.S. Cl. ................................... 264/101; 264/240; 264/250; 264/257; 264/259; 264/299; 264/332; 501/90; 501/92; 501/91; 501/95
[58] Field of Search .................. 106/44; 264/101, 240, 264/250, 257, 259, 299, 332, 56, 60, 65

[56] References Cited

U.S. PATENT DOCUMENTS

| | | | |
|---|---|---|---|
| 2,814,857 | 12/1957 | Duckworth | 106/44 |
| 3,235,346 | 2/1966 | Hucke | 428/539.5 |
| 3,348,967 | 10/1967 | Hucke | 427/399 |
| 3,459,842 | 8/1969 | Wakefield | 106/44 |
| 3,644,135 | 2/1972 | Speyer | 264/60 |
| 3,708,325 | 1/1973 | Kurtz | 264/60 |
| 3,718,441 | 2/1973 | Landingham | 264/60 |
| 3,725,015 | 4/1973 | Weaver | 264/60 |
| 3,882,210 | 6/1975 | Crossley | 264/63 |
| 3,951,587 | 4/1976 | Alliegro et al. | 106/44 |
| 4,141,948 | 2/1979 | Laskow et al. | 106/44 |

FOREIGN PATENT DOCUMENTS 713710  8/1954  United Kingdom .................. 106/44

Primary Examiner—O. R. Vertiz
Assistant Examiner—Mark Bell
Attorney, Agent, or Firm—John F. McDevitt; Lawrence R. Kempton; Philip L Schlamp

[57] ABSTRACT

A method is described for making a shaped silicon carbide-silicon matrix composite. A confined carbon fiber preform is infiltrated with sufficient molten silicon metal at a temperature in the range of from about 1400° C. to about 1800° C. in an inert atmosphere or vacuum. Silicon carbide powder can also be incorporated in the preform structure.

8 Claims, 1 Drawing Figure

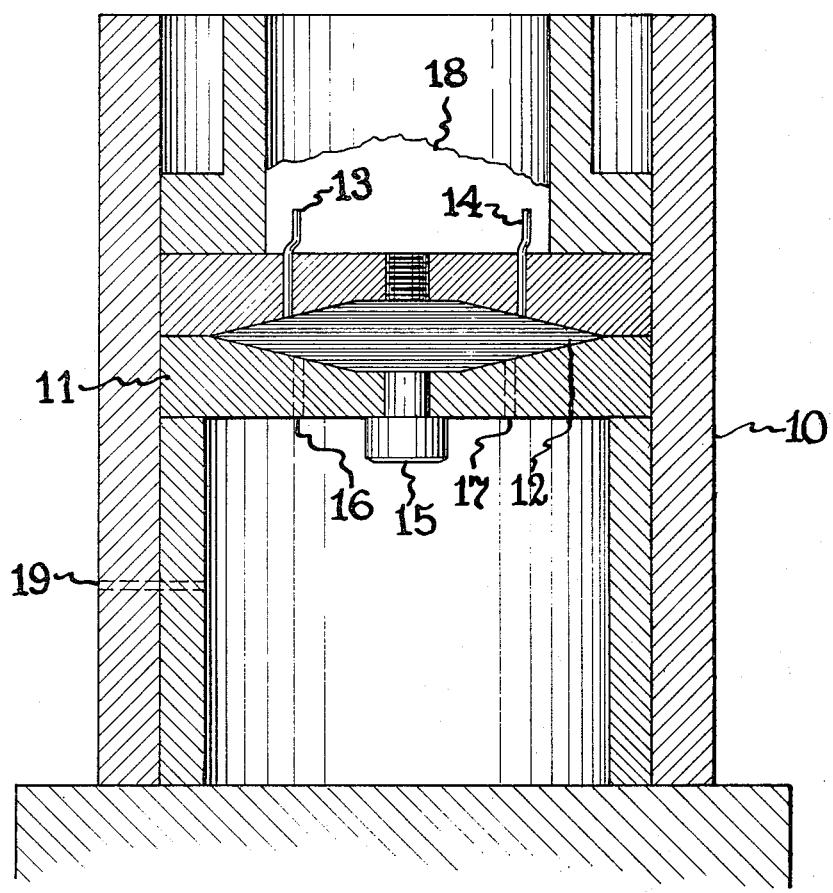

METHOD OF MAKING A SHAPED SILICON CARBIDE-SILICON MATRIX COMPOSITE AND ARTICLES MADE THEREBY

This is a division of application Ser. No. 100,579, filed Dec. 5, 1979, now U.S. Pat. No. 4,240,835, which is a continuation-in-part of our copending application Ser. No. 946,718, filed Sept. 28, 1978, now abandoned, which is a division of our application Ser. No. 572,969, filed Apr. 30, 1975, now U.S. Pat. No. 4,141,948, as a continuation-in-part of application Ser. No. 354,106, filed Apr. 24, 1973 now abandoned, and all assigned to the same assignee as the present invention.

This invention relates to a method of making shaped silicon carbide-silicon matrix composite articles and to the articles made thereby.

Prior to the present invention, the fabrication of parts for high temperature applications, such as turbine blades and vanes for gas turbines, etc., presented a formidable challenge to the heat engine industry. As higher operating temperature requirements were identified such as in excess of 1200° C., increasing attention was directed to ceramics, such as silicon carbide. However, the design problems associated with the brittle nature of these materials and difficulty of fabrication presented severe obstacles.

Those skilled in the art know that structural ceramics are either hot-pressed and machined to final shape or sintered to final shape. The former process is time consuming and expensive; the latter is subject to distortion and dimensional uncertainties. Other methods of fabrication include reaction-binding as taught by Forrest U.S. Pat. No. 3,495,939. Finely divided silicon carbide and carbon are blended with a binder and extruded to a particular shape, such as a tube. The shaped structure is heated in air to produce a porous shaped structure. The structure is then contacted in a vertical position with molten silicon metal or vapor resulting in silicon infiltration. As a result, a shaped silicon carbide body is produced having valuable characteristics. However, the procedure of shaping the porous body by extrusion is limited, particularly where several parts are required and the shape is somewhat complex.

A further refinement in attempting to prepare a silicon carbide ceramic is shown by Wakefield U.S. Pat. No. 3,459,842. Wakefield utilizes a mixture of powdered silicon and silicon carbide whiskers and places the mixture into a quartz vessel. As taught by Wakefield, a reinforced silicon composite material is produced which can be made with aligned silicon carbide crystals by elevating the temperature slightly above the melting point of silicon and drawing the quartz vessel. The procedure of Wakefield, however, is therefore limited to the use of costly silicon carbide whiskers. In addition, alignment of the silicon carbide crystals as taught by Wakefield can only be achieved by using a vessel made out of a drawable material such as quartz.

An object of the present invention, therefore, is to produce a shaped silicon carbide refractory article within a close tolerance of the desired shape such as ½% by a simple efficient procedure.

Another object of the present invention is to provide a method for producing a variety of shaped silicon carbide objects having a broad spectrum in properties ranging from a material having flow characteristics and ductility similar to silicon, to a material as hard as pure silicon carbide.

A further object of the present invention is to produce a shaped plural phase silicon carbide ceramic exhibiting fibrous composite-like properties because of the aligned nature of the silicon carbide phase.

A still further object of the present invention is to provide a shaped silicon carbide refractory article exhibiting improved physical properties.

These and further objects, features and advantages of the invention become apparent from the following description and drawing in which:

The drawing shows a front view of a mold containing a shaped carbon fiber structure and the mold is in a supporting structure. Above the mold there is shown a charge of powdered silicon.

More particularly, there is shown in the drawing at 10, a supporting structure which can be used and is made from graphite such as Armco Speer 580, which can be readily machined to a particular shape. There is shown at 11 a mold, which also can be made from Armco Speer 580, or other suitable material capable of withstanding elevated temperatures and resistance to molten silicon. At 12 there is shown a mold cavity filled with a preformed carbon fiber structure such as a preform; and at 13 and 14 there are shown carbon fiber wicks. Vent holes 16 and 17 allow for the escape of hot gases from the mold which can exit out of vent 19. A connector, or mold forming means at 15 having a threaded end can be used to confine the molten silicon formed by heating the powdered silicon charge at 18 in the mold cavity.

According to certain embodiments of the present invention, there is provided a method for making a shaped ceramic part capable of providing a 0.1″×0.1″ section having an average 3 point bend test tensile value of from 30 KSI to 99 KSI when tested over a ⅜″ span at a temperature of 25° C., where said shaped ceramic has from about 4% to 30% by weight carbon in the chemically combined form, or as a mixture of chemically combined carbon and elemental carbon, which comprises uniformly infiltrating with molten silicon at a temperature of from about 1400° C. to about 1800° C. under an inert atmosphere, or in a vacuum, a shaped carbon fiber structure having an average specific gravity of from about 1.3 to 2 which is confined in and substantially fills a mold cavity shaped substantially to the shape of the ceramic part until the infiltrated silicon substantially fills the mold cavity and thereafter separating the resulting ceramic part from the mold.

As used hereinafter, the term carbon fiber or filaments includes commercially available carbon fiber as previously defined. The carbon fiber includes, for example, "high strength" graphite having a tensile psi of typically $10^5$ psi, a modulus of $20 \times 10^6$ psi and a carbonized density of 1.6 g/cc as shown by Johnson et al Pat. No. 3,412,062. Preferably the carbon fiber has a specific gravity of about 1.3 to 1.5 as calculated from dimensional measurements and weight and includes, for example, WYK braid, WYB tow of Union Carbide Corp. and other carbonized fibers derived from rayon or regenerated cellulose fibers such as carbon felt and still other carbonizable fibrous materials. In addition to carbonized rayon fibers any carbon fibers having a specific gravity as defined above derived from other polymeric materials such as polyacrylonitrile, polyacetylene, such as shown by Krutchen U.S. Pat. No. 3,852,235 assigned to the same assignee as the present invention, polyvinyl chloride, polyvinyl acetate, etc., can be employed. The term "preform," as used hereinafter, is preferably a shaped structure of oriented carbon fibers such as a prepreg which can further include carboneous residues of other carbonized materials. To form a preform, a carbon fiber tow, braid, flock, felt, mat, or cloth is treated with molten wax or other binder such as cellulose nitrate, polyesters, epoxy and other resinous binders, colloidal graphite, etc.

It has also been found that significant amounts of conventional silicon carbide powder optionally can be incorporated in the final shaped silicon carbide refractory article without any serious deterioration of the desired improved physical properties in said final article. In accordance with the present invention, the silicon carbide powder can simply be mixed with the carbon fiber and a binder to form the preform and with said additive serving to substitute for part of the molten silicon thereafter infiltrated into said preform. The infiltrated molten silicon chemically reacts with the carbon fiber to produce aligned silicon carbide crystals in a silicon metal matrix and with the silicon carbide crystals already present in the preform being dispersed in the silicon matrix. Examination of the microstructure in this type final ceramic article has revealed that the silicon carbide crystals originally present in the preform have retained the conventional hexagonal or $\alpha$ crystalline structure whereas the aligned silicon carbide crystals formed by infiltration of the preform with molten silicon exhibit a cubic or $\beta$ crystalline structure. Such incorporation of silicon carbide powder in the final ceramic article is not only beneficial from a cost standpoint but also enhances a more uniform microstructure and imparts greater dimensional stability during the molding operation. Additionally, the incorporation of silicon carbide provides a moderating effect upon the temperature increase resulting from the exothermic reaction between silicon and carbon that occurs during the initial infiltration and conversion operations. In the specific embodiments hereinafter illustrated, up to 25 weight percent silicon carbide powder based on the weight of the final ceramic article has been found not to degrade the desired final physical properties to any great extent, and still greater proportions may be found useful depending upon the final microstructure and physical properties being sought.

In the broadest sense, therefore, the improved ceramic article of the present invention comprises aligned silicon carbide crystals in a silicon metal matrix, which are aligned in the same manner as were the carbon fibers in the preform structure, and which can further contain silicon carbide crystals being dispersed in the silicon metal matrix. Since the preform structure can either employ a general parallel relationship between the carbon fibers as is obtained with a tow, braid or cloth as well as a general non-parallel carbon fiber relationship which is exemplified with a flock, felt or mat fiber arrangement, the alignment of silicon carbide crystals in the final ceramic article varies accordingly. The parallel fiber and crystal arrangement is to be preferred if mechanical strength requirements for the improved ceramic article are critical. As previously noted, the present improved ceramic article can also be further characterized in having from about 4% to 30% by weight carbon in the chemically combined form, or as a mixture of chemically combined carbon and elemental carbon. The improved physical properties of the present final ceramic article are represented by an elastic modulus of from about $30 \times 10^6$ psi to about $60 \times 10^6$ psi and which is further accompanied by a permanent elastic strain when measured at a temperature of at least 1000° C. from 0% to about 6% in value. The density of said improved ceramic article lies in the range of about 2.3 to 3.0 grams/cc as measured by the conventional weight and volume displacement measurement technique.

In one embodiment of the invention, a mold is precision machined to provide a mold cavity shaped to accommodate such parts as gas turbine shroud sections or flame holders, aircraft engine shroud sections, gas turbine transition pieces, diesel engine parts such as pistons and rings, or preignition cups or cylinder liners, heat exchange pipes, hot processing dies, combustion liners, fusion reactor hardware, wear resistant tiles, etc. Still other automotive parts can be produced in the same manner to include engine turbochargers and manifolds as well as brake rotors. Unrelated product applications for the improved ceramic article of the present invention include containers for the chemical industry to produce chemicals such as inorganic phosphors at elevated temperatures and/or corrosive environments as well as cookware and oven parts for the home. If desired, the mold can be treated, for example, sprayed, with a boron nitride release agent. The use of boron nitride is shown in the application of William B. Hillig, Ser. No. 419,286, filed Nov. 27, 1973, now abandoned and assigned to the same assignee as the present invention.

There is placed in the mold, a carbon fiber structure such as a preform machined or fashioned substantially to the shape and size of the mold cavity. The total weight of carbon fiber per unit of mold cavity volume can vary widely depending upon the nature of the carbon fiber and manner by which the carbon fiber is aligned in the preform. In certain instances a positive pressure can be imposed on the carbon fiber structure in the mold cavity to conform it to the shape of the mold by the use of a mold screw or an external means for sealing the mold.

As a result of the use of carbon fiber wicks, as shown in the drawing, infiltration of molten silicon into the mold can be facilitated. Hole diameters as small as 10 mils to 125 mils can be advantageously used with wicks to avoid the subsequent formation of excessively large nibs. Those skilled in the art know that small nibs can be removed by a simple finishing operation. In the absence of wicks, hole diameters of at least $\frac{3}{8}"$ can be used which result in nibs large enough to require a separate machining step. In addition, silicon rich areas can be formed on the surface of the part where the large nib was attached resulting in surface variations.

The mold can be placed in the support structure as shown in the drawing. A charge of powdered silicon can be placed above the mold and the whole placed in an oven. The oven can be evacuated to pressures of 3 to $5 \times 10^{-2}$ torr and optionally with an inert gas such as argon or nitrogen etc., to render the oven atmosphere substantially non-oxidizing.

The charge can be heated to a temperature of 1400° C. to 1800° C. Infiltration of the shaped carbon structure can be accomplished over a 1 to 60 minute period or more and preferably 5 to 20 minutes. After allowing the mold to cool a temperature of about 20° C., the part can be readily separated. In the event a release agent is not used on the mold surface, the mold can be broken to separate the shaped ceramic.

As shown in Report No. 74CRD282 of the Technical Information Series of the General Electric Company, Corporate Research and Development, November 1974, scanning electron microscopy has established that the shaped ceramic of the present invention can be composites of aligned silicon carbide crystals in a silicon metal matrix, which are aligned in the same manner as were the carbon fibers in the preform structure. A parallel alignment of said carbon fibers provides improved tensile properties as was previously indicated. It has been found that silicon penetration of the carbon fibers occurs most readily along the direction of the fibers and less readily transverse to the fibers. Depending upon the volume fraction of carbon fibers used in the prepreg or preform, a corresponding volume fraction of aligned silicon carbide crystals surrounded by domains of silicon will be generated in the resulting silicon carbide-silicon matrix composite.

There can be present from about 5% to about 75% volume percent of aligned silicon carbide crystals based on total composite volume of the silicon carbide-silicon matrix composites of the present invention. At a temperature of at least 1000° C., the composites of the present invention also can exhibit from 0% to 6% permanent plastic strain depending upon whether there is a high volume fraction of aligned silicon carbide crystals, or a low volume. Plastic strain of up to 6% can allow for the relief of localized stresses of sufficient strength can lead to failure. The improved silicon carbide-silicon composite of the present invention exhibits an elastic modulus of from about $30 \times 10^6$ psi to about $60 \times 10^6$ psi.

In order that those skilled in the art will be better able to practice the invention, the following examples are given by way of illustration and not by way of limitation. All parts are by weight.

EXAMPLE 1

A carbon fiber preform was prepared from low modulus WCA carbon cloth of Union Carbide Corporation using an aqueous colloidal suspension of graphite as a binder. The density of the fiber was approximately 1.38–1.48 grams/cc and the total weight of fiber in the preform after it had been machined to a 2.5" diameter disk as shown in the drawing was about 11 grams.

A 3" diameter mold was machined out of Speer 580 graphite having a mold cavity of about 2.5 inches and a 0.42 inch thickness. Four 0.125 diameter infiltration holes were drilled into the top half of the mold and 0.125 inch diameter vent holes were drilled into the bottom half of the mold. Carbon fiber wicks in the form of WYK braid were inserted into the infiltration holes and protruded about 0.125 inches from the top of the mold. The inside surface of the mold was treated with a boron nitride powder in a form of an aerosol spray.

The carbon fiber prepreg was then placed in the mold, and the mold was then placed in a supporting structure as shown in the drawing made from Armco Speer 580 graphite which had been precision machined to the specifications of the mold. A charge of powdered silicon was then poured on top of the mold surface. In estimating the amount of silicon, there was employed up to about a 15% excess of that amount of silicon required to fill the mold cavity in the molten state.

The mold and supporting structure was then placed in a furnace which was maintained under a vacuum of about $1 \times 10^{-2}$ torr. A pressure of from $1 \times 10^{-2}$ torr to 3 torr also was operable. The furnace was maintained at a temperature of about 1600° C. It was found that the silicon powder converted to molten silicon in about 15 minutes and it was allowed to infiltrate the carbon fiber prepreg. After an initial cooling period, the mold and supporting structure was removed from the furnace and allowed to cool under atmospheric conditions. The mold was then opened and there was obtained a disk which conformed within 0.2% of the dimensions of the mold cavity. Based on method of preparation, the disk was a silicon carbide, silicon ceramic having about 16% by weight carbon in the chemically combined form, or as a mixture of chemically combined carbon and elemental carbon and about 84% by weight of silicon.

A $0.1'' \times 0.1'' \times 1.0''$ section of the above composite was removed with a diamond cutting wheel and subjected to a 3 point bend test, which is described as follows:

The specimen is placed on steel rollers $\frac{5}{8}''$ spaced apart in a testing machine and loaded through a steel roller at a rate of 0.005 in/min. The fracture load is obtained from the autographic record of test, as shown in ASTM E4-72, Verification of Testing Machines. The stress is calculated from the following elementary stress formula as follows:

$$\sigma = \frac{3}{2} \frac{Pl}{bh^2}$$

where P is the fracture load, l the span ($\frac{5}{8}''$), b the specimen width (0.1") and h the thickness (0.1").

The 3 point bend test value of the above specimen was found to be about 38 KSI. Another specimen of the above silicon carbide-silicon ceramic was also examined with a scanning electron microscope after about 40 microns of silicon was etched away in a hydrogen fluoride-nitric acid etching solution. It was found that the ceramic resembled a composite with silicon carbide crystals substantially aligned in a pattern corresponding to the carbon fibers where the silicon carbide crystals were surrounded by domains of silicon metal to produce a silicon carbide-silicon matrix composite. The volume fraction of the patterned silicon carbide crystals was estimated to be 75% based on the total composite. The silicon carbide-silicon matrix composite also had an elastic modulus of about $48 \times 10^6$ psi. It also had a density of about 2.8 grams/cc.

Those skilled in the art would know that, based on the above procedure for making precision molding high performance shaped ceramics, that the improved silicon carbide-silicon matrix composites of the present invention would be suitable if made in the form of a gas turbine shroud or aircraft engine shroud sections.

EXAMPLE 2

The procedure of Example 1 was repeated except that a mold was machined having a $6'' \times 6''$ square $\times \frac{1}{4}''$ thick cavity which was slightly curved to a 48" radius. The mold was charged with WDF Union Carbide graphite felt amounting to about 11 grams of carbon. There was obtained a silicon carbide-silicon matrix composite having about 4% by weight of carbon in the chemically combined form or as a mixture of chemically combined carbon and elemental carbon and about 96% by weight of silicon. The composite had a density of about 2.4 grams/cc.

A specimen of the composite was removed as in Example 1 and it showed a 3 point bend test value of about 25-30 KSI. It had a modulus of about $35 \times 10^6$ psi and contained patterned silicon carbide crystals having a volume fraction of about 9% by volume. It also exhibited a plastic strain of about 1 to 6% when measured at a temperature between 1000° C. to 1350° C.

EXAMPLE 3

In accordance with the procedure of Example 1, a mold having a cavity of about 150"×178"×3" long was made and charged with about 1.92 grams of Union Carbide WYD carbon fiber tow having a density of about 1.38 grams/cc. Based on method of preparation there was obtained a shaped ceramic structure having about 26% by weight of carbon in the chemically combined carbon and elemental carbon and about 74% by weight of silicon. The ceramic also had a density of about 2.92 grams/cc.

A 3 point bend test showed that the ceramic had a tensile strength of about 70 KSI. The modulus of the ceramic was about $57.5 \times 10^6$ psi. Examination under a scanning electron microscope of an etched specimen as described in Example 1 showed that the composite had a volume fraction of about 72% of silicon carbide crystals which were substantially aligned in the same direction as the carbon fibers originally employed in the form of a carbon fiber tow. Those skilled in the art would know that a silicon carbide-silicon matrix composite having the aforementioned characteristics would be ideally suited in high temperature applications such as parts for aircraft shroud sections.

EXAMPLE 4

The procedure of Example 1 was repeated except that a variety of carbon fiber was used having a specific gravity over a range of from 1.3 to 1.5 and a higher range of specific gravity of between about 1.6 to 2. The purpose of the investigation was to determine whether the nature of the carbon fiber with respect to its specific gravity related to the ultimate tensile properties in the final silicon carbide-silicon matrix composite with respect to KSI values as determined by the above-described 3 point bend test. The weight percent of the carbon employed in making the composite was about 25% in each instance. The density of the WYK braid representing so-called "low density" fibers had a density between 1.3 to 1.5 grams/cc, while the Morganite I and Morganite II representing the "high" density fibers had a density between 1.6 to 2 grams/cc. The following results were obtained where room temperature shows the KSI values under atmospheric conditions and 1000° C. and 1200° C. show the results obtained at elevated temperatures; in addition silicon is also shown to illustrate the results achieved with the improved silicon carbide-silicon matrix composites of the present invention.

| | KSI VALUES | | |
|---|---|---|---|
| | 25° C. | 1000° C. | 1200° C. |
| Low density | 43 | 41 | 42 |
| High density | 22 | 34 | — |
| Silicon | 13 | 7 | 14 |

The above results establish that optimum results are achieved in accordance with the practice of the invention when low density carbon fibers are used.

EXAMPLE 5

The procedure of Example 1 was modified to produce the ceramic article with physical dimensions of 1.5 inches by 6.5 inches by 0.125 inch in a suitable size mold cavity. A carbon fiber prepreg was prepared from a physical mixture containing 75 weight percent crushed carbon felt and 25 weight percent silicon carbide powder of 80 mesh size to which had been added an epoxy resin binder. This prepreg was placed in the mold cavity and infiltrated with molten silicon at 1550° C. for approximately 45 minutes in the same manner described in said Example 1. From said final ceramic plate, specimens were removed for physical measurement of density and elastic modulus which are reported below:

| Sample | Density(Grams/cc) | Youngs Modulus(PSI) |
|---|---|---|
| 1 | 2.87 | $45.5 \times 10^6$ |
| 2 | 2.90 | $48.8 \times 10^6$ |
| 3 | 2.85 | $44.7 \times 10^6$ |

As can be noted from the above reported elastic modulus values, a superior modulus is exhibited as compared with Example 2 which did not incorporate silicon carbide powder with carbon felt to prepare the prepreg.

EXAMPLE 6

The procedure of Example 5 was repeated except that the carbon fiber prepreg was produced from a physical mixture containing only 10% by weight silicon carbide powder in said mixture. The density and elastic modulus values measured upon the final ceramic plate are as follows:

| Sample | Density(Grams/cc) | Youngs Modulus(PSI) |
|---|---|---|
| 1 | 2.99 | $56.8 \times 10^6$ |
| 2 | 2.98 | $55.8 \times 10^6$ |
| 3 | 3.03 | $55.9 \times 10^6$ |

It can be noted from the above reported density and elastic modulus values as compared with the preceding example that both physical properties are improved at a lower content of the silicon carbide powder additive.

Although the above examples illustrate only a few of the very many variables which can be employed in the practice of the invention as well as the types of improved silicon carbide-silicon matrix composites, it would be understood that the true scope of the invention and composites made thereby can be more fully appreciated when the above examples are read along with the description preceding these examples.

What we claim as new and desire to secure by Letters Patent of the United States is:

1. A method for making a silicon carbide-silicon matrix ceramic of the desired shape which comprises:
    (a) infiltrating molten silicon at a temperature of from 1400° C. to 1800° C. into a shaped carbon fiber part which further includes silicon carbide crystals dispersed therein while said part is substantially contained in a mold in a non-oxidizing atmosphere and under reduced pressure, and
    (b) separating the resulting silicon carbide ceramic from the mold where the fiber used in (a) has a specific gravity of from about 1.3 to 1.5.

2. A method as in claim 1 where the infiltration of the molten silicon is accomplished under a pressure of from $1 \times 10^{-2}$ torr to 3 torr.

3. A method as in claim 1, where the carbon fiber is in the form of elongated carbon filaments in general parallel relationship.

4. A method as in claim 1, where the carbon fiber is in the form of carbon fiber cloth.

5. A method as in claim 1, where the carbon fiber is in the form of carbon fiber tow.

6. A method as in claim 1, where the mold is treated with boron nitride prior to the infiltration of the molten silicon.

7. A method as in claim 1 where carbon fiber wicks are used in the mold to facilitate the flow of molten silicon therein.

8. A method as in claim 1 where said shaped ceramic part has from about 4% to about 30% by weight of carbon in a chemically combined form or as a mixture of chemically combined carbon and elemental carbon.

* * * * *